(12) United States Patent
Richardson

(10) Patent No.: US 6,209,599 B1
(45) Date of Patent: Apr. 3, 2001

(54) FORM FITTING MOTORCYCLE COVER

(76) Inventor: George T. Richardson, 5952 S. Adams Dr., Littleton, CO (US) 80121

( * ) Notice: Subject to any disclaimer, the term of this patent is extended or adjusted under 35 U.S.C. 154(b) by 0 days.

(21) Appl. No.: 09/354,741

(22) Filed: Jul. 29, 1999

(51) Int. Cl.$^7$ .................................................. B65D 65/02

(52) U.S. Cl. ........................................... 150/167; 296/136

(58) Field of Search ........................... 296/136; 150/167, 150/164, 166

(56) References Cited

U.S. PATENT DOCUMENTS

| | | | |
|---|---|---|---|
| 2,279,812 | * | 4/1942 | Barlett .................................. 150/166 |
| 4,172,614 | * | 10/1979 | Guido, Jr. ........................ 150/100.17 |
| 4,283,084 | * | 8/1981 | Gallagher ............................ 150/167 |
| 4,813,734 | * | 3/1989 | Hoover ............................ 150/100.17 |
| 4,944,340 | * | 7/1990 | Tortorich .............................. 150/167 |
| 4,976,389 | * | 12/1990 | McLellan et al. ............... 150/167 X |
| 5,056,817 | * | 10/1991 | Fuller ................................ 150/166 X |
| 5,193,724 | * | 3/1993 | Robbins .......................... 150/167 X |
| 5,282,502 | * | 2/1994 | Ballard .................................. 150/167 |
| 5,372,169 | * | 12/1994 | Norton et al. ........................ 150/167 |
| 5,445,200 | * | 8/1995 | Celestino et al. .................... 150/167 |
| 5,562,139 | * | 10/1996 | Cseri .................................... 150/167 |
| 5,662,372 | * | 9/1997 | Lubkeman ........................... 150/166 |
| 5,795,009 | * | 8/1998 | Sack et al. ....................... 150/167 X |
| 6,070,629 | * | 6/2000 | Whiteside .......................... 150/166 |

* cited by examiner

Primary Examiner—Allan N. Shoap
Assistant Examiner—Tri M. Mai
(74) Attorney, Agent, or Firm—Edwin H. Crabtree; Ramon L. Pizarro; Donald W. Margolis

(57) ABSTRACT

A motorcycle cover used for receipt on top of and around a motorcycle when the motorcycle is transported on an open trailer. The cover provides protection against outdoor elements and from cover material flapping, fluttering or wearing against a surface on the motorcycle. The cover includes a body cover member and a front wheel cover member. The body cover member is adapted for receipt on top of and around a rear portion of the motorcycle which include the gas tank, seat, engine, body frame and rear wheel. The front wheel cover member is adapted for receipt on top of and around a front portion of the motorcycle that includes the front wheel, front wheel frame and light. The body cover member includes a heavy nylon exterior protective wrap having a top portion, first and second side portions, a front portion and a bottom portion. The front portion is releasably attached to one side of the first side portion. Also, the front portion is releasably attached to one end of the bottom portion. The first side portion is releasably attached to one side of the bottom portion. The first and second sides include loops spaced along an upper portion and along a lower portion of the two sides. The loops in the first and second sides receive a bungy cord threaded therethrough. The bungy cord, when tightened, applies tension on the body cover member and thus a form fitting and streamlined motorcycle cover around the body of the motorcycle.

17 Claims, 1 Drawing Sheet

FORM FITTING MOTORCYCLE COVER

BACKGROUND OF THE INVENTION (a) Field of the Invention

This invention relates to vehicle covers and more particularly, but not by way of limitation, to a form fitting motorcycle cover or travel cover used when transporting a motorcycle on an open trailer.

(b) Discussion of Prior Art

Heretofore there have been a variety of different types of protective covers for automobiles, motorcycles and bicycles. In U.S. Pat. No. 4,715,646 to Goffi et al. a covering is described for covering a frame along with semi-circular sheath wheel covers. In U.S. Pat. No. 4,598,725 to Brewer a poncho is disclosed that can be used for covering and protecting a bicycle. In U.S. Pat. No 3,968,913 to Weed et al. a protective cover is described which completely surrounds a bicycle with the bicycle mounted on a car rack. In U.S. Pat. No. 4,967,389 a bicycle cover is illustrated which is designed to cover a bicycle and reduce fluttering when the bicycle is transported on top of an automobile.

None of the above mentioned protective covers provide the unique features, structure and advantages of the subject motorcycle cover used when transporting a motorcycle on an open trailer as described herein.

SUMMARY OF THE INVENTION

In view of the foregoing, it is a primary object of the present invention to provide a protective motorcycle cover which can be quickly mounted on top of and around a motorcycle when the motorcycle is transported on an open trailer.

Another object of the invention is the motorcycle cover is designed to be form fitting and streamlined on the motorcycle. The cover provides protection against outdoor elements and from any cover material flapping, fluttering or wearing against expensive painted surfaces on the motorcycle.

Still another object of the motorcycle cover is cover provides protection for both the body of the motorcycle such as the gas tank, seat, engine, body frame, rear wheel with fender along with protecting the front wheel with fender, front wheel frame and light. The cover is designed to completely cover the motorcycle except for the bottom of the front and rear tires and the handle bars.

Yet another object of the invention is the cover includes an interior, lightweight, fleece sock drape which is received over the body of the motorcycle for added protection of the vehicle prior to receiving an exterior protective wrap over the sock drape.

The motorcycle cover includes a motorcycle body cover member and a front wheel cover member. The body cover member is adapted for receipt on top of and around the gas tank, seat, engine, body frame and rear wheel with fender. The front wheel cover member is adapted for receipt on top of and around the front wheel and fender, front wheel frame and light. The body cover member includes a heavy nylon exterior protective wrap having a top portion, first and second side portions, a front portion and a bottom portion. The front portion is releasably attached to one side of the first side portion. Also, the front portion is releasably attached to one end of the bottom portion. The first side portion is releasably attached to one side of the bottom portion. The first and second sides include loops spaced along an upper portion and along a lower portion of the two sides. The loops in the first and second sides receive a bungy cord threaded therethrough. The bungy cord, when tightened, applies tension on the body cover member and thus a form fitting and streamlined motorcycle cover around the body of the motorcycle.

These and other objects of the present invention will become apparent to those familiar with the different types vehicle covers, bicycle covers and motorcycle covers when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
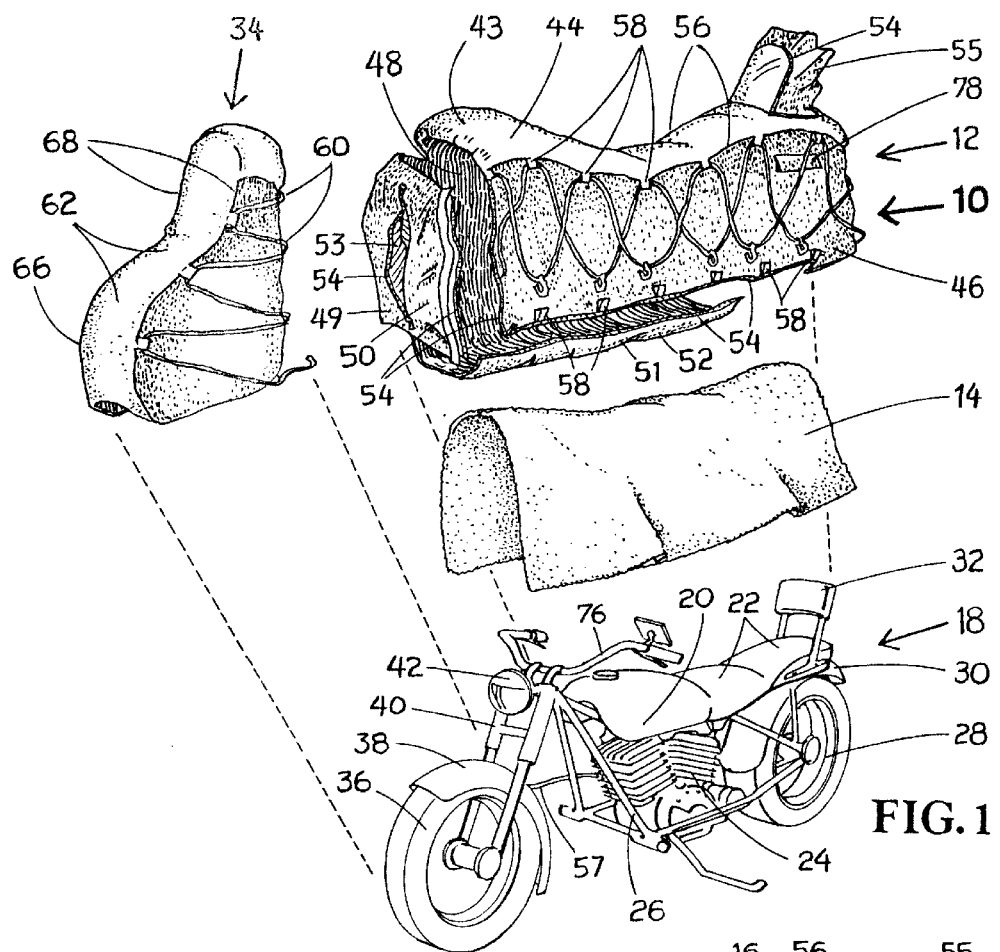
FIG. 1 is an exploded perspective view of the subject motorcycle cover. In this drawing, a body cover member having an interior sock body drape and an exterior protective body wrap are shown positioned above a motorcycle and ready for receipt around a body of the motorcycle. Also, a front wheel cover is shown positioned above and ready for receipt around a front wheel and fender of the motorcycle.

In FIG. 1, an exploded perspective view of the subject motorcycle cover is illustrated with the motorcycle cover having a general reference numeral 10. Broadly, the motorcycle cover 10 includes a body cover member having a general reference numeral 12. The body cover member 12 includes an optional interior, lightweight, fleece sock drape 14 and a heavy nylon weatherproof exterior protective wrap 16. The sock drape 14 and the exterior protective wrap 16 are shown positioned above a motorcycle and ready for receipt on top of and around the body of the motorcycle. The motorcycle is shown with a general reference numeral 18. The sock drape 14 is received on top of and over the sides of the body of the motorcycle 18 and provides added protection when transporting or storing the motorcycle.

A rear portion of the motorcycle 18 includes a gas tank 20, a seat 22, an engine 24, a body frame 26, a rear wheel 28 and rear fender 30 along with an optional sizzy bar 32 mounted at the rear of the seat 22. Obviously, there are many other components making up the motorcycle 18 which are not mentioned herein or shown in the drawings and not necessary in describing the structure and function of the subject invention.

Also, the motorcycle cover 10 also includes a front wheel cover member designed for covering a front portion of the motorcycle and having a general reference numeral 34. The front wheel cover member 34 is shown positioned above and ready for receipt on top of and around a front wheel 36, a front fender 38, a front wheel frame 40 and light 42. The front wheel cover 34, similar to the exterior protective body cover, is also made of heavy nylon material.

The exterior protective wrap 16 includes a top portion 44 made of a heavy duty, water proof stretchable material, a first side portion 46, a second side portion 48, a front portion 50 and a bottom portion 52. A portion of the inside of the second side portion 48 and a portion of the inside of the bottom portion 52 can be seen in this drawing. The front portion 50 is releasably attached to a front side 45 of the first side portion 46 and to a front side 43 of the top portion 44 using a zipper 54. Also, the first side portion 46 is releasably attached using another zipper 54 to one side 51 of the bottom portion 52 and to a lower side 49 of the front portion 50. In this manner, the protective wrap 16 completely surrounds the motorcycle body when zipped together and tension is applied to the wrap.

The top portion 44, along the length of opposite sides 56 next to the first and second side portions 46 and 48, includes a plurality of loops 58. Also, there are a plurality of loops 58 along the length of the lower portion of the first and second sides portions 46 and 48. The loops 58, on the second side 48 and next to the opposite side of the top portion 44, are not shown in FIGS. 1 and 2, but are similar to the loops 58 shown on the first side 46. Also, it should be mentioned that the second side portion 48 is similar to the first side portion 46 as described herein. The loops 58, in the top portion 44, receive a bungy cord 60 threaded therethrough. The bungy cord 60 also includes hooks 61 for engaging the lower loops 58 on the first and second side portions 46 and 48. The bungy cord 60 with hooks 61, when tightened as shown in FIG. 2, apply tension on the body cover member 12 and thus a form fitting and streamlined motorcycle cover around the body of the motorcycle.

The body cover member 12 may also have a number of additional features depending on the type, model and style of motorcycle. For example, the front portion 50 may include an expandable pleat 53 with zipper 54 for enlarging the size of the front portion 50 when used with motorcycles having larger engines, gas tanks and forward mounted foot controls. Also for example, the rear of the top portion 44 may include a sizzy bar cover 55 with zipper 54 for covering the sizzy bar 32. Further, there may be openings in the first side portion 46 or second side portion 48 with zippers 54 for a speedometer and odometer cable 57.

Referring back to the front wheel cover member 34, the cover member 34 includes a combination top and front portion 62 made of a heavy duty, weatherproof, stretchable material, a first side portion 64 and a second side portion 66. The combination top and front portion 62, along the length of opposite sides 68 next to the first and second side portions 64 and 66, includes a plurality of loops 58. Also, there are a plurality of loops 58 along the length of the lower portion of the first and second side portions 64 and 66. The lower loops 58 on the first and second side portions 64 and 66 are not shown in the drawings. It should be mentioned that the second side portion 66 is similar to the first side portion 64 as described herein. The loops 58, in the combination top and front portion 62 and the first and second side portions 64 and 66 receive another bungy cord 60 threaded therethrough. The bungy cord 60, when tightened as shown in FIG. 2, applies tension on the front wheel cover member 34 and thus a form fitting and streamlined motorcycle cover around the front wheel 36 and front wheel frame 40 of the motorcycle 18. Also, the front wheel cover 34 includes an opening therein with zipper 54 for receiving a portion of the speedometer and odometer cable 57. This opening is not shown in the drawings.

Figure 2:
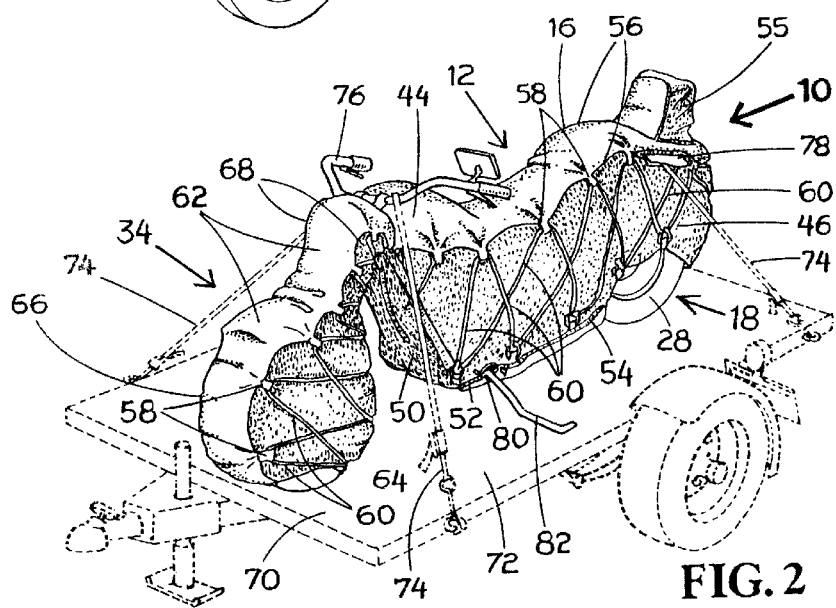
FIG. 2 is a perspective view of the motorcycle cover received on top of and around the motorcycle with the motorcycle ready to be transported on an open trailer. The motorcycle cover is shown tightened on and around the motorcycle to provide a form fitting and streamlined cover when traveling at high speeds on the trailer.

In FIG. 2, a perspective view of the motorcycle cover 10 is shown received on top of and around the motorcycle 18 with the motorcycle ready to be transported on an open trailer 70. The motorcycle 18 is held in place on top of a trailer bed 72 using ties 74 attached opposite side of motorcycle handle bars 76 and on opposite sides of the rear of the body frame 26. Note in this drawing, the body cover member 12 also includes side flaps 78 with zippers 54 for allowing the rear ties 74 to be attached to the body frame 26 covered by the first and second side portions 46 and 48 of the exterior protective wrap 16. Further, the exterior protective wrap 16 includes a kick stand opening 80 with zipper 54 for allowing a kick stand 82 to be extended outwardly from the body frame 26 for added stability when transporting the motorcycle 18.

The motorcycle cover 10 with exterior protective wrap 16 is shown tightened on and around the motorcycle 10 to be provide a form fitting and streamlined cover when traveling at high speeds on the trailer. The wrap 16 is tightened by pulling the bungy cord 60 through the upper and lower loops 58, which in turn stretches the top portion 44 downwardly along it's opposite sides 56. The bungy cord 60 is then tied in place and the exterior protective wrap 16 with the interior sock drape 14 are held snugly in place around body and rear of the motorcycle 10. It should be mentioned that the rear of the protective wrap 16 may be left open so that any trapped air inside the wrap may escape during travel or the rear ends of the side portions 46 and 48 and the rear of the top portion 44 may be folded and secured around the rear wheel 28 and rear fender 30 of the motorcycle 18 if desired.

Also in FIG. 2, the motorcycle cover 10 with front wheel cover member 34 is shown tightened on and around the front wheel 36, front wheel fender 38 and front wheel frame 40 to be provide a form fitting and streamlined cover when traveling at high speeds on the trailer 70. The front wheel cover 34, similar to the exterior protective wrap 16, is tightened by pulling the bungy cord 60 through the upper and lower loops 58, which in turn stretches the combined to and front portion 44 downwardly along it's opposite sides 68. The bungy cord 60 is then tied in place and the front wheel cover 34 is held securely around the front portion of the motorcycle 10.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A form fitting, streamlined motorcycle cover used for receipt on top of and around a rear portion of a motorcycle, the motorcycle cover comprising:

a body cover member having a weatherproof exterior protective wrap, said wrap adapted for receipt around the rear portion of the motorcycle; and a body cover tightening means attached to said wrap for tightening said wrap on and around the rear of the motorcycle, a front wheel cover member, said front wheel cover member adapted for receipt around a front portion of the motorcycle;

a plurality of loops attached to a first side portion of said front wheel cover member with a bungee cord threaded therethrough for tightening said front wheel cover member on and around the front portion of the motorcycle.

2. The motorcycle cover as described in claim 1 wherein said body cover member includes an interior sock drape, said interior sock drape is adapted for receipt around the rear portion of the motorcycle with said exterior protective wrap received therearound.

3. The motorcycle cover as described in claim 1 wherein said body cover tightening means is a plurality of loops attached to a first side portion of said wrap with a bungee cord threaded therethrough.

4. The motorcycle cover as described in claim 1 wherein said body cover tightening means is a plurality of loops attached to a first side portion and a second side portion of said wrap with bungee cords threaded therethrough.

5. The motorcycle cover as described in claim 1 further including a plurality of loops attached to a second side portion of said front wheel cover member with a bungee cord threaded therethrough.

6. A form fitting, streamlined motorcycle cover used for receipt on top of and around a front portion and a rear portion of a motorcycle, the motorcycle cover comprising:
   a body cover member having an exterior weatherproof protective wrap, said wrap adapted for receipt around the rear portion of the motorcycle;
   body cover tightening means attached to said wrap for tightening said wrap on and around the rear portion of the motorcycle;
   a front wheel cover member, said front wheel cover member adapted for receipt around the front portion of the motorcycle; and
   a plurality of loops attached to sides of said front wheel cover member with bungee cords threaded therethrough for tightening said front wheel cover member on and around the front portion of the motorcycle.

7. The motorcycle cover as described in claim 6 wherein said body cover member includes an interior sock drape, said interior sock drape adapted for receipt around the rear portion of the motorcycle with said exterior protective wrap received therearound.

8. The motorcycle cover as described in claim 6 wherein said body cover tightening means is a plurality of loops attached to sides of said wrap with bungee cords threaded therethrough.

9. The motorcycle cover as described in claim 6 wherein said body cover member includes a front portion with a pleat formed therein for the expanding the size of the front portion for different size motorcycles.

10. The motorcycle cover as described in claim 6 wherein said body cover member includes a top portion with a rear of the top portion having a sizzy bar cover formed therein, said sizzy bar cover adapted for receipt over a sizzy bar mounted on the rear of the motorcycle.

11. The motorcycle cover as described in claim 6 wherein said body cover member includes a first side portion with a kick stand opening therein, the kick stand opening adapted for receiving a kick stand of the motorcycle therethrough.

12. A form fitting, streamlined motorcycle cover used for reciept on top of and around a rear portion of a motorcycle, the motorcycle cover comprising:
   a body cover member having an exterior protective wrap with a top portion, a first portion, a second side portion, a front portion and a bottom portion, the front portion of said wrap releasably attached to one side of the first side portion, the front portion releasably attached to one end of the bottom portion, the first side portion releasably attached to one side of the bottom portion, the first and second side portions including loops spaced along an upper portion and along a lower portion of the first and second sides;
   a first bungee cord threaded through the loops in the first side portion of said wrap; and
   a second bungee cord threaded through the loops in the second side portion of said wrap;
   said first and second bungee cords when tightened on the loops apply tension on said body cover member.

13. The motorcycle cover as described in claim 12 further including a front wheel cover member, said front wheel cover member adapted for receipt around a front portion of the motorcycle and front wheel cover tightening means attached to a side of said front wheel cover member for tightening said front wheel cover member on and around the front portion of the motorcycle.

14. The motorcycle cover as described in claim 13 wherein said front wheel cover tightening means is a plurality of loops attached to a first side portion of said front wheel cover member with a bungee cord threaded therethrough.

15. The motorcycle cover as described in claim 13 wherein said front wheel cover tightening means is a plurality of loops attached to a first side portion and a second side portion of said front wheel cover member with bungee cords threaded therethrough.

16. The motorcycle cover as described in claim 13 wherein said front wheel cover includes an opening therein and adapted for receiving a portion of a motorcycle speedometer and odometer cable.

17. The motorcycle cover as described in claim 13 wherein said body cover member includes an opening therein and adapted for receiving a portion of a motorcycle speedometer and odometer cable.

\* \* \* \* \*